July 3, 1962

J. F. HAWLEY 3,042,346

WIRING HARNESS FOR ELECTRICALLY HEATED
VARIABLE PITCH PROPELLER BLADE

Filed April 15, 1959

INVENTOR.
James F. Hawley
BY
W. E. Finken
HIS ATTORNEY

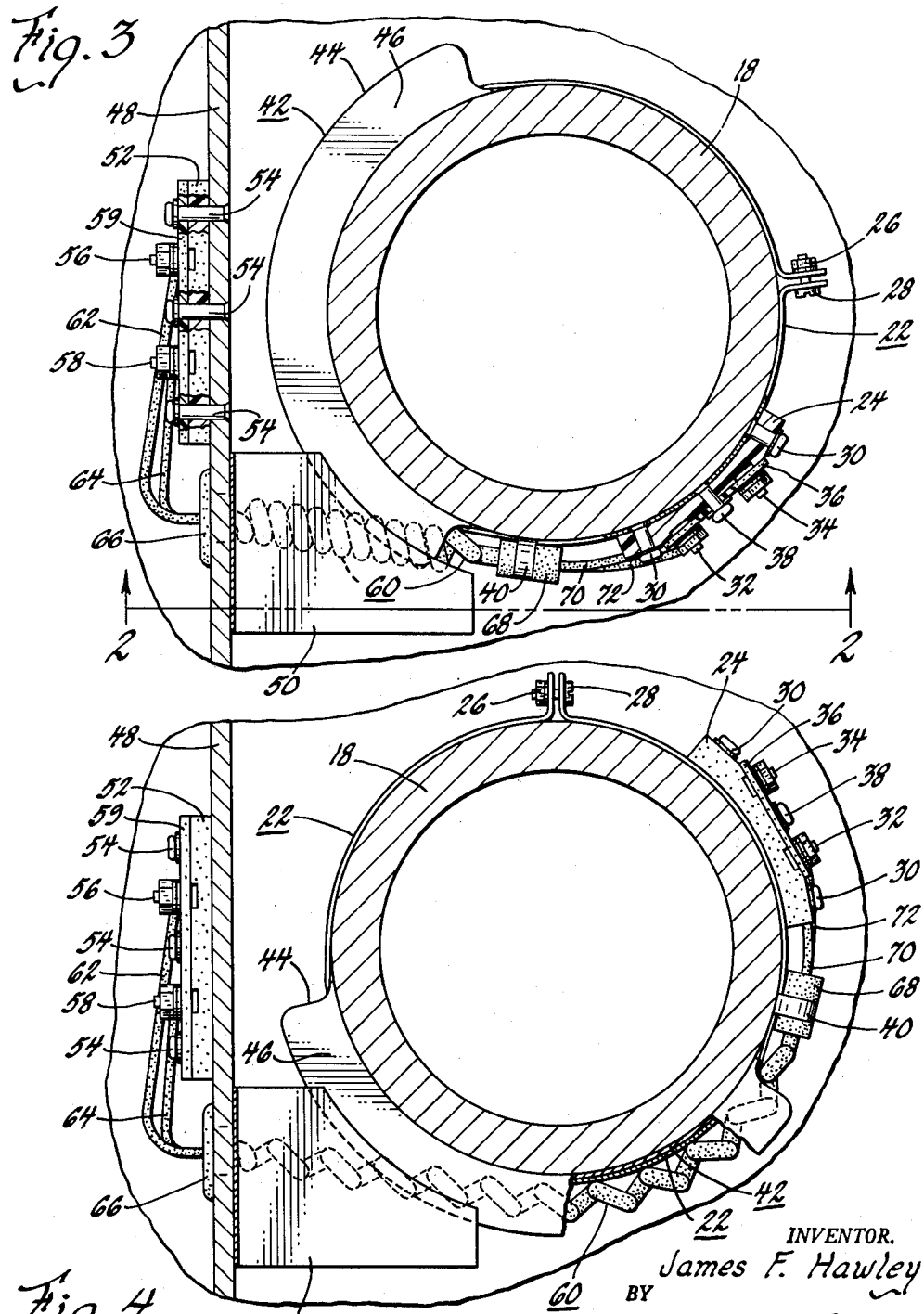

United States Patent Office 3,042,346
Patented July 3, 1962

3,042,346
WIRING HARNESS FOR ELECTRICALLY HEATED VARIABLE PITCH PROPELLER BLADE
James F. Hawley, Tipp City, Ohio, assignor to General Motors Corporation, Detroit, Mich., a corporation of Delaware
Filed Apr. 15, 1959, Ser. No. 806,603
3 Claims. (Cl. 244—134)

This invention pertains to variable pitch propellers, and particularly to a flexible wiring harness between relatively rotatable propeller blade and hub structures.

Heretofore, electrical power has been supplied to propeller blade de-icing heaters through brush and slip ring connections from the propeller hub since the blades are rotatable about their longitudinal axes relative to the hub during pitch adjustment. However, brush and slip ring assemblies are expensive, and are subject to wear during relative rotation between the brushes and the slip rings. The present invention relates to a flexible wiring harness, one end of which is rigidly connected to the propeller blade and the other end of which is rigidly connected to the hub for supplying electrical power to a blade de-icing heater while permitting rotation of the blade relative to the hub about the longitudinal blade axis. The flexible wiring harness is substantially cheaper to install and is less susceptible to malfunction than the brush and slip ring assemblies heretofore used. Accordingly, among my objects are the provision of a flexible wiring harness for conducting electrical power between relatively rotatable parts of a variable pitch propeller assembly; the further provision of a precoiled cord constructed and arranged to assume a minimum length in the unstressed condition for supplying electrical power from a propeller hub to a variable pitch propeller blade; and the still further provision of a flexible wiring harness for a variable pitch propeller blade including means for preventing outward radial movement of the flexible cord due to centrifugal force during propeller rotation.

The aforementioned and other objects are accomplished in the present invention by precoiling an intermediate portion of the wiring harness so that in an unstressed condition, adjacent coils abut each other. Specifically, the wiring harness is designed for use with a propeller blade having an electrical de-icing element suitably secured to the leading edge thereof. The propeller assembly may be of the type disclosed in copending application Serial No. 572,348, now Patent #2,986,220, filed March 19, 1956, in the name of Bodem et al. and assigned to the assignee of this invention. The de-icing element includes a terminal portion which extends axially along the shank of the propeller blade towards the root thereof. The shank portion of the propeller blade is provided with the usual cuff ring, and a terminal carrying strap is clamped about the shank portion of the propeller blade radially inward of the cuff ring. The strap retains an arcuate radially extending flanged member in assembled relation with the propeller blade shank and has an integral clamp member formed thereon. A forward retaining boss of the wiring harness having an intermediate annular groove is received by the integral clamp member and thus securely attaches one end of the wiring harness to the propeller blade. The leads projecting from the boss are suitably attached to the terminal block attached to the strap.

The other end of the wiring harness has a rear retaining boss attached thereto which abuts a ring attached to the propeller hub. The leads from this end of the wiring harness are attached to a terminal block supported on the hub ring. The extensible, helically wound convolutions of the cord are disposed between the two bosses and are restrained against radial outward movement due to centrifugal force by the flanged member and a plate attached to the hub and overlying a portion of the flanged member. The convolutions of the flexible cord need only be extensible in an amount sufficient to accommodate the angular movement of the propeller blade within its pitch adjusting range. In the instant embodiment, the propeller blade is adjustable between a maximum reverse angle of a —4° to the full feathered angle. The wiring harness is assembled with the propeller blade so that the convolutions are substantially fully contracted when the propeller blade is at the maximum negative blade angle and are substantially fully expanded when the propeller blade is in the feathered position.

Further objects and advantages of the present invention will be apparent from the following description, reference being had to the accompanying drawings, wherein a preferred embodiment of the present invention is clearly shown.

In the drawings:

FIGURE 3 is a sectional view taken along lines 3—3 of FIGURE 2 showing the propeller blade in the maximum negative pitch position.

FIGURE 4 is a view similar to FIGURE 3 showing the blade in an intermediate pitch position.

Figure 1:
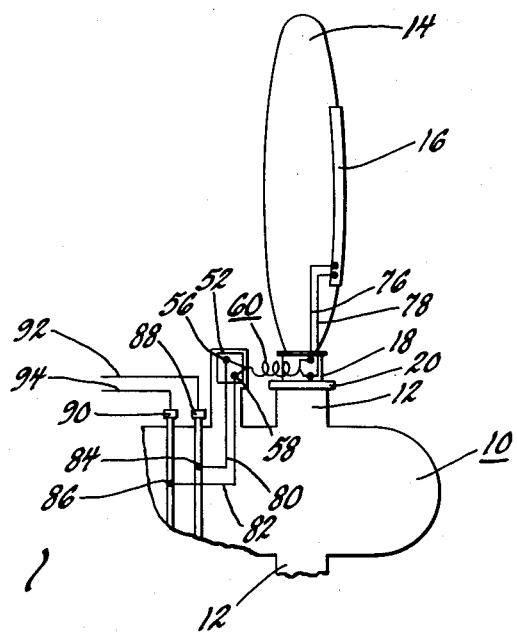
FIGURE 1 is a schematic view of a propeller having the flexible wiring harness of this invention.

With particular reference to FIGURE 1, a propeller is shown including a hub 10 having a plurality of radially extending sockets 12. A propeller blade 14 is rotatably journalled in each socket 12 for movement about its longitudinal axis to different pitch positions which may include a range from full reverse to full feather. The blade 14 has an electrical de-icing heater 16 suitably secured to a portion of the leading edge thereof. The de-icing heater 16 is adapted to be intermittently energized from a source of electrical power to prevent the accumulation of ice on the leading edge of the propeller blades in a manner well known to the art.

Figure 2:
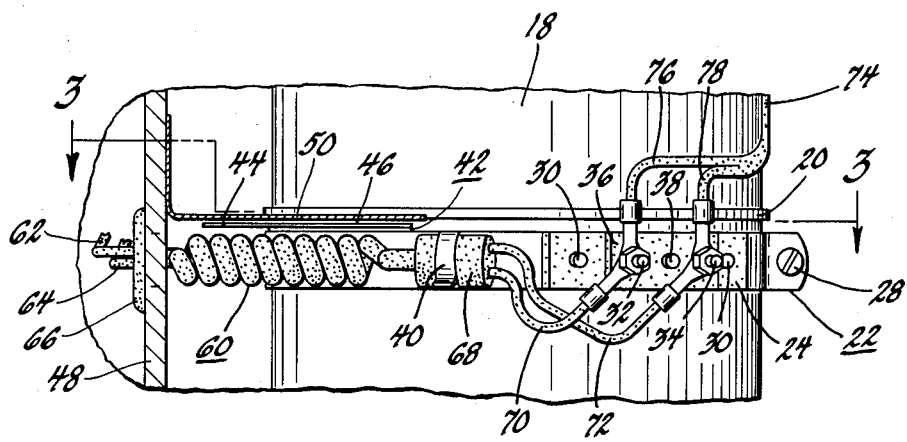
FIGURE 2 is a fragmentary view, partly in section and partly in elevation, taken in the direction of line 2—2 of FIGURE 3.

With reference to FIGURES 2 through 4, the propeller blade 14 includes a cylindrical shank portion 18 having an integral cuff ring 20. A metallic strap 22 carrying a terminal block 24 is attached to the shank portion 18 of the propeller blade radially inward of the cuff ring 20. The strap 22 may be held in assembled relation with the blade by a nut and bolt, as indicated by numerals 26 and 28, and the terminal block 24 is attached to the strap 22 by rivets 30. A pair of terminal studs 32 and 34 are held in assembled relation with the terminal block 24 by an insulating plate 36 and a rivet 38. The strap 22, as seen particularly in FIGURE 2, is formed with an integral arcuate clamp prong 40.

An arcuate member 42 having an integral radially extending flange 44 is retained in assembled relation with the shank portion 18 of the blade by the strap 22. The flange 44 subtends an angle of substantially 150° as depicted in FIGURE 3, and the upper surface 46 of the flange 44 is disposed in contiguous relation to the lower surface of the cuff ring 20, as viewed in FIGURE 2.

The propeller hub 10 has a spinner mounting ring 48 attached thereto rearwardly of the hub sockets 12. A flanged plate 50 suitably attached to the ring 48 has a portion overlying part of the flange 44 as seen in FIGURES 3 and 4. A second terminal block 52 is attached to the spinner supporting ring 48 by rivets 54. A pair of terminal studs 56 and 58 are held in assembled relation with the terminal block 52 by insulating plate 59.

A helically coiled extensible cord 60 is employed to conduct electrical power from the terminal studs 56 and 58 to the terminal studs 32 and 34. The cord 60 is extensible by virtue of the plurality of closely wound helical convolutions disposed between its ends. Moreover, due to the inherent resiliency of the cord material, comprising both its conductors and the insulating covering therefor, the cord will automatically contract when the extending force is relieved. Leads 62 and 64 from one end of the flexible wiring harness are attached to terminal studs 56 and 58, respectively. A flanged boss 66 is formed at one end of the convolutions and extends through an aperture in the spinner mounting ring 48. The boss 66 is securely attached to the mounting ring 48. A second boss 68 having an intermediate annular groove is held in assembled relation with the blade 14 by the clamp prong 40. Leads 70 and 72 at the other end of the wiring harness are attached to terminal studs 32 and 34, respectively. The de-icing element 16 may include a terminal portion 74 which is bonded to the shank portion 18 of the propeller blade and has leads 76 and 78 connected to the terminal studs 32 and 34, respectively.

As seen in FIGURE 1, wires 80 and 82 connect the terminal studs 56 and 58 with slip rings 84 and 86, respectively. The slip rings 84 and 86 are engaged by stationary brushes 88 and 90, respectively, which are connected by wires 92 and 94, respectively, with a suitable source of electrical power in the aircraft, not shown. The propeller blade is shown in the full negative pitch position in FIGURE 3 at which time the coils of the cord are fully contracted. During rotation of the propeller blade 16 towards the feathered position, from the position of FIGURE 3 to the position of FIGURE 4, convolutions of the cord will be extended. The flange 44 and the plate 50 cooperate to prevent radial outward movement of the cord 60 due to centrifugal force during rotation of the propeller hub 10. As is seen in FIGURE 4, since the member 42 rotates with the propeller blade 16, the coiled portion of the wiring harness is always confined beneath the flange 44. Moreover, opposite ends of the wiring harness are securely attached to the spinner mounting ring 48 and the propeller blade 16 by the bosses 66 and 68 whereby flexing of the wiring harness is limited to the coiled portion therebetween. Accordingly, thrust loads will not be imposed on the lead wires and the terminal studs of either terminal block.

While the embodiment of the invention as herein disclosed constitutes a preferred form, it is to be understood that other forms might be adopted.

What is claimed is as follows:

1. In a variable pitch propeller, a hub, a propeller blade journalled therein for rotation about its longitudinal axis to different pitch positions, an electrical heater on said blade, a first terminal assembly operatively connected to said hub, a strap attached to said blade and carrying a second terminal assembly, an arcuate member having a flange attached to said blade by said strap, a plate operatively connected to said hub and overlying a portion of said flange, and a cord having end leads connected to said terminal assemblies and an intermediate flexible portion comprising closely wound helical convolutions capable of extension and contraction during rotation of the blade relative to said hub, said convolutions being restrained against outward movement relative to said blade due to centrifugal force during propeller rotation by said plate and flange.

2. The combination set forth in claim 1 wherein said cord has bosses at opposite ends of said closely wound convolutions, means attaching one of said bosses to said propeller blade, and means operatively connecting the other boss to said hub whereby flexure of said cord is confined to said convolutions.

3. The combination set forth in claim 2 wherein the means connecting said one boss to said blade comprise a clamp integral with said strap.

References Cited in the file of this patent

UNITED STATES PATENTS

| | | |
|---|---|---|
| 2,402,770 | Poekel | June 25, 1946 |
| 2,473,147 | Jensen | June 14, 1949 |
| 2,609,417 | Cox et al. | Sept. 2, 1952 |
| 2,695,146 | DeWitt | Nov. 23, 1954 |
| 2,721,929 | Schwartz et al. | Oct. 25, 1955 |

FOREIGN PATENTS

| | | |
|---|---|---|
| 547,371 | Great Britain | Aug. 25, 1942 |